United States Patent
Doerner

(10) Patent No.: US 10,168,963 B2
(45) Date of Patent: Jan. 1, 2019

(54) STORAGE CONDITIONING WITH INTELLIGENT REBUILD

(71) Applicant: Quantum Corporation, San Jose, CA (US)

(72) Inventor: Don Doerner, San Jose, CA (US)

(73) Assignee: Quantum Corporation, San Jose, CA (US)

(*) Notice: Subject to any disclaimer, the term of this patent is extended or adjusted under 35 U.S.C. 154(b) by 504 days.

(21) Appl. No.: 14/944,251

(22) Filed: Nov. 18, 2015

(65) Prior Publication Data

US 2017/0139595 A1 May 18, 2017

(51) Int. Cl.
*G06F 3/06* (2006.01)
*G06F 11/14* (2006.01)

(52) U.S. Cl.
CPC .............. *G06F 3/067* (2013.01); *G06F 3/065* (2013.01); *G06F 3/0616* (2013.01); *G06F 3/0632* (2013.01); *G06F 3/0689* (2013.01); *G06F 11/14* (2013.01)

(58) Field of Classification Search
CPC ........ G06F 3/067; G06F 11/14; G06F 3/0689; G06F 3/0632; G06F 3/0616; G06F 3/065
See application file for complete search history.

(56) References Cited

U.S. PATENT DOCUMENTS

| | | | | |
|---|---|---|---|---|
| 2014/0136571 A1* | 5/2014 | Bonvin | ............. | G06F 17/30318 707/792 |
| 2014/0351528 A1* | 11/2014 | Motwani | ................ | H04L 9/085 711/156 |

* cited by examiner

*Primary Examiner* — Michael Alsip
(74) *Attorney, Agent, or Firm* — Eschweiler & Potashnik, LLC

(57) ABSTRACT

Storage conditioning for a data storage system having D data storage devices (DSDs) is provided. E erasure codes (ECs) for an object are stored in the system, D>E. A map of d E-sized vectors of the D DSDs is produced. A DSD appears in e vectors. The ratio d/e is the reduced form of D/E. A hash value is produced for the object. A destination vector for storing the ECs is selected using the hash value according to a pre-determined, substantially uniform distribution. A compromised vector affected by a first DSD becoming unable to store ECs is identified. An intact vector that is not affected by the first DSD is identified. A complete set of ECs is produced from an incomplete set of ECs in the compromised vector and is distributed to the intact vector then copied back when the compromised vector is once again intact.

17 Claims, 10 Drawing Sheets

| Disk Number | Vector | | | | |
|---|---|---|---|---|---|
| 1 | 0 | 2 | 4 | 7 | 9 |
| 2 | 0 | 2 | 4 | 7 | 9 |
| 3 | 0 | 2 | 4 | 7 | 9 |
| 4 | 0 | 2 | 4 | 7 | 9 |
| 5 | 0 | 2 | 5 | 7 | 9 |
| 6 | 0 | 2 | 5 | 7 | 9 |
| 7 | 0 | 2 | 5 | 7 | 9 |
| 8 | 0 | 2 | 5 | 7 | 9 |
| 9 | 0 | 2 | 5 | 7 | 10 |
| 10 | 0 | 2 | 5 | 7 | 10 |
| 11 | 0 | 2 | 5 | 7 | 10 |
| 12 | 0 | 2 | 5 | 7 | 10 |
| 13 | 0 | 3 | 5 | 7 | 10 |
| 14 | 0 | 3 | 5 | 7 | 10 |
| 15 | 0 | 3 | 5 | 7 | 10 |
| 16 | 0 | 3 | 5 | 7 | 10 |
| 17 | 0 | 3 | 5 | 8 | 10 |
| 18 | 0 | 3 | 5 | 8 | 10 |
| 19 | 0 | 3 | 5 | 8 | 10 |
| 20 | 0 | 3 | 5 | 8 | 10 |
| 21 | 1 | 3 | 5 | 8 | 10 |
| 22 | 1 | 3 | 5 | 8 | 10 |
| 23 | 1 | 3 | 5 | 8 | 10 |
| 24 | 1 | 3 | 5 | 8 | 10 |
| 25 | 1 | 3 | 6 | 8 | 10 |
| 26 | 1 | 3 | 6 | 8 | 10 |
| 27 | 1 | 3 | 6 | 8 | 10 |
| 28 | 1 | 3 | 6 | 8 | 10 |
| 29 | 1 | 3 | 6 | 8 | 11 |
| 30 | 1 | 3 | 6 | 8 | 11 |
| 31 | 1 | 3 | 6 | 8 | 11 |
| 32 | 1 | 3 | 6 | 8 | 11 |
| 33 | 1 | 4 | 6 | 8 | 11 |
| 34 | 1 | 4 | 6 | 8 | 11 |
| 35 | 1 | 4 | 6 | 8 | 11 |
| 36 | 1 | 4 | 6 | 8 | 11 |
| 37 | 1 | 4 | 6 | 9 | 11 |
| 38 | 1 | 4 | 6 | 9 | 11 |
| 39 | 1 | 4 | 6 | 9 | 11 |
| 40 | 1 | 4 | 6 | 9 | 11 |
| 41 | 2 | 4 | 6 | 9 | 11 |
| 42 | 2 | 4 | 6 | 9 | 11 |
| 43 | 2 | 4 | 6 | 9 | 11 |
| 44 | 2 | 4 | 6 | 9 | 11 |
| 45 | 2 | 4 | 7 | 9 | 11 |
| 46 | 2 | 4 | 7 | 9 | 11 |
| 47 | 2 | 4 | 7 | 9 | 11 |
| 48 | 2 | 4 | 7 | 9 | 11 |

Figure 2

| Disk Number | Vector | | | | |
|---|---|---|---|---|---|
| 1  | 0 | 2 | 4 | 7 | 9  |
| 2  | 0 | 2 | 4 | 7 | 9  |
| 3  | 0 | 2 | 4 | 7 | 9  |
| 4  | 0 | 2 | 4 | 7 | 9  |
| 5  | 0 | 2 | 5 | 7 | 9  |
| 6  | 0 | 2 | 5 | 7 | 9  |
| 7  | 0 | 2 | 5 | 7 | 9  |
| 8  | 0 | 2 | 5 | 7 | 9  |
| 9  | X | X | X | X | X  |
| 10 | 0 | 2 | 5 | 7 | 10 |
| 11 | 0 | 2 | 5 | 7 | 10 |
| 12 | 0 | 2 | 5 | 7 | 10 |
| 13 | 0 | 3 | 5 | 7 | 10 |
| 14 | 0 | 3 | 5 | 7 | 10 |
| 15 | 0 | 3 | 5 | 7 | 10 |
| 16 | 0 | 3 | 5 | 7 | 10 |
| 17 | 0 | 3 | 5 | 8 | 10 |
| 18 | 0 | 3 | 5 | 8 | 10 |
| 19 | 0 | 3 | 5 | 8 | 10 |
| 20 | 0 | 3 | 5 | 8 | 10 |
| 21 | 1 | 3 | 5 | 8 | 10 |
| 22 | 1 | 3 | 5 | 8 | 10 |
| 23 | 1 | 3 | 5 | 8 | 10 |
| 24 | 1 | 3 | 5 | 8 | 10 |
| 25 | 1 | 3 | 6 | 8 | 10 |
| 26 | 1 | 3 | 6 | 8 | 10 |
| 27 | 1 | 3 | 6 | 8 | 10 |
| 28 | 1 | 3 | 6 | 8 | 10 |
| 29 | 1 | 3 | 6 | 8 | 11 |
| 30 | 1 | 3 | 6 | 8 | 11 |
| 31 | 1 | 3 | 6 | 8 | 11 |
| 32 | 1 | 3 | 6 | 8 | 11 |
| 33 | 1 | 4 | 6 | 8 | 11 |
| 34 | 1 | 4 | 6 | 8 | 11 |
| 35 | 1 | 4 | 6 | 8 | 11 |
| 36 | 1 | 4 | 6 | 8 | 11 |
| 37 | 1 | 4 | 6 | 9 | 11 |
| 38 | 1 | 4 | 6 | 9 | 11 |
| 39 | 1 | 4 | 6 | 9 | 11 |
| 40 | 1 | 4 | 6 | 9 | 11 |
| 41 | 2 | 4 | 6 | 9 | 11 |
| 42 | 2 | 4 | 6 | 9 | 11 |
| 43 | 2 | 4 | 6 | 9 | 11 |
| 44 | 2 | 4 | 6 | 9 | 11 |
| 45 | 2 | 4 | 7 | 9 | 11 |
| 46 | 2 | 4 | 7 | 9 | 11 |
| 47 | 2 | 4 | 7 | 9 | 11 |
| 48 | 2 | 4 | 7 | 9 | 11 |

Figure 3

| Disk Number | Vector | | | | |
|---|---|---|---|---|---|
| 1 | 0 | 2 | 4 | 7 | 9 |
| 2 | 0 | 2 | 4 | 7 | 9 |
| 3 | 0 | 2 | 4 | 7 | 9 |
| 4 | 0 | 2 | 4 | 7 | 9 |
| 5 | 0 | 2 | 5 | 7 | 9 |
| 6 | 0 | 2 | 5 | 7 | 9 |
| 7 | 0 | 2 | 5 | 7 | 9 |
| 8 | 0 | 2 | 5 | 7 | 9 |
| 9 | X | X | X | X | X |
| 10 | 0 | 2 | 5 | 7 | 10 |
| 11 | 0 | 2 | 5 | 7 | 10 |
| 12 | 0 | 2 | 5 | 7 | 10 |
| 13 | 0 | 3 | 5 | 7 | 10 |
| 14 | 0 | 3 | 5 | 7 | 10 |
| 15 | 0 | 3 | 5 | 7 | 10 |
| 16 | 0 | 3 | 5 | 7 | 10 |
| 17 | X | X | X | X | X |
| 18 | 0 | 3 | 5 | 8 | 10 |
| 19 | 0 | 3 | 5 | 8 | 10 |
| 20 | 0 | 3 | 5 | 8 | 10 |
| 21 | 1 | 3 | 5 | 8 | 10 |
| 22 | 1 | 3 | 5 | 8 | 10 |
| 23 | 1 | 3 | 5 | 8 | 10 |
| 24 | 1 | 3 | 5 | 8 | 10 |
| 25 | 1 | 3 | 6 | 8 | 10 |
| 26 | 1 | 3 | 6 | 8 | 10 |
| 27 | 1 | 3 | 6 | 8 | 10 |
| 28 | 1 | 3 | 6 | 8 | 10 |
| 29 | 1 | 3 | 6 | 8 | 11 |
| 30 | 1 | 3 | 6 | 8 | 11 |
| 31 | 1 | 3 | 6 | 8 | 11 |
| 32 | 1 | 3 | 6 | 8 | 11 |
| 33 | 1 | 4 | 6 | 8 | 11 |
| 34 | 1 | 4 | 6 | 8 | 11 |
| 35 | 1 | 4 | 6 | 8 | 11 |
| 36 | 1 | 4 | 6 | 8 | 11 |
| 37 | 1 | 4 | 6 | 9 | 11 |
| 38 | 1 | 4 | 6 | 9 | 11 |
| 39 | 1 | 4 | 6 | 9 | 11 |
| 40 | 1 | 4 | 6 | 9 | 11 |
| 41 | 2 | 4 | 6 | 9 | 11 |
| 42 | 2 | 4 | 6 | 9 | 11 |
| 43 | 2 | 4 | 6 | 9 | 11 |
| 44 | 2 | 4 | 6 | 9 | 11 |
| 45 | 2 | 4 | 7 | 9 | 11 |
| 46 | 2 | 4 | 7 | 9 | 11 |
| 47 | 2 | 4 | 7 | 9 | 11 |
| 48 | 2 | 4 | 7 | 9 | 11 |

Figure 4

STORAGE CONDITIONING WITH INTELLIGENT REBUILD

BACKGROUND

Individual storage devices (e.g., disks) are useful for storing data. Over the years, many optimizations of individual storage devices have been made. While optimized individual devices are useful, collections of storage devices may be even more useful. For example, data protection schemes (e.g., replication, erasure coding (EC), redundant arrays of independent disks (RAID)) may be implemented on a collection of disks to provide greater data protection than is possible with just a single disk. Typically, the data protection scheme is tightly integrated with the devices available and controls the number of devices used to store data.

Using collections of storage devices over which stored data may be distributed to protect the data may produce issues beyond those associated with any single storage device. For example, issues concerning maximizing performance, maximizing configurability, and minimizing data vulnerability all while managing power consumption may be much more complex for collections of devices than for individual devices.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2 illustrates an example collection of storage devices.

FIG. 3 illustrates an example collection of storage devices.

FIG. 4 illustrates an example collection of storage devices.

DETAILED DESCRIPTION

Figure 1:
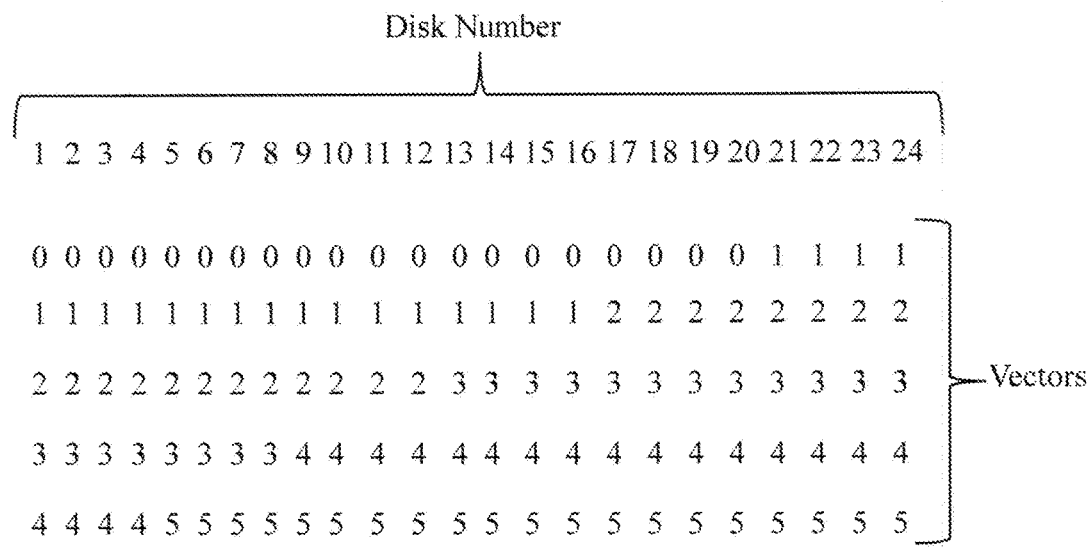
FIG. 1 illustrates an example collection of storage devices.

Example apparatus and methods provide improved storage conditioning with an intelligent rebuild capacity for a collection of storage devices (e.g., disks). While examples are provided for disks, other storage devices (e.g., flash drives, solid state drives, tapes, shingled magnetic recording (SMR) drives) may also be employed in a storage pool. Additionally, a collection of storage devices in a storage pool may be heterogeneous and include different types of storage devices.

"Storage conditioning," as used herein, refers to operating a collection of storage devices as a storage pool and providing a functionality for the storage pool over and above the functionality that may be provided by the individual storage devices. The functionality facilitates using the storage devices more optimally than conventional collections of devices. The more optimal functionality improves performance by spreading workloads so that members of the collection of devices are used more equally. The more optimal functionality improves configurability by allowing a data durability scheme (e.g., redundant arrays of independent disks (RAID), erasure codes (EC), replication) to be independent of the number of storage devices that are available to store data to support the data durability scheme. The more optimal functionality reduces data vulnerability by more intelligently and automatically rebuilding a set of symbols that become compromised due to a device becoming unavailable (e.g., failing). The more intelligent rebuild may prioritize which sets of symbols are to be rebuilt and redistributed based on the vulnerability of a set of symbols. The more intelligent rebuild will avoid single device bottlenecks that are typically found in conventional systems.

Example apparatus and methods may work with a system that provides a key:value (KV) pair interface to a storage system or process. The storage system or process may interact with one or more storage pools that each have their own collection of storage devices for which an independent instance of example improved storage conditioning with intelligent rebuild operates.

Example apparatus and methods address the recent computer-based problem of: given a durability scheme (e.g., EC, RAID, replication, combinations thereof), and given a number of individual devices available to operate as a storage pool to support the durability scheme, organize members of the storage pool to maximize performance of the storage pool, to maximize independence between the durability scheme and the number of devices available, while minimizing data vulnerability.

The problem solved includes considering the question: given a durability scheme that requires E devices to implement, and given a number D of devices, where D>E, how should sets of data produced by the durability scheme be distributed between the D devices? How should the D devices be logically organized into subsets of devices to store the protection data produced by the durability scheme? Solutions to these problems can only be implemented in a computer and storage system and cannot be achieved by mental steps or pen and paper because electrical control signals that automatically control the operations of storage devices are created and passed throughout the data storage system to implement the solution. Automatic partitioning of devices, automatic distribution of erasure codes or other data to the partitions of devices, and automatic intelligent rebuild of compromised sets of erasure codes or other data are performed in a computer system.

In one embodiment, if E devices are needed to support a data durability scheme, and D devices are available, D>E, examine the ratio D:E. Let d:e be a reduced form of D:E. "Reduced" is used herein in its mathematical context. For example, if D=24 and E=20, then D:E is 24:20 and the reduced form of D:E is d:e 6:5. The ratio d:e identifies that d unique sets of E devices will be identified in the D available devices. A member of the d sets of E devices may be referred to as a vector. A device will appear once in a vector. A device will appear in e of the d vectors. In the D=24 E=20 example, there will be six sets (e.g., vectors) of twenty devices. A device will appear in five of the six sets. In other embodiments, the D devices may be partitioned into different numbers of vectors and vectors may have different inclusion rules.

The d sets of E unique devices define the minimum number of sets of devices that when used uniformly will provide the most balanced utilization of all D devices. The devices may be used uniformly because of the uniform distribution of the hash function used for interacting with the KV pair.

Example apparatus and methods may provide a scale out object store system that includes two or more conditioned storage pools that provide a key:value pair interface. Different members of the two or more storage pools may be supported by different instances of improved storage conditioning with intelligent rebuild processes.

FIG. 1 illustrates the D=24, E=20 example. In the example:
  D=24=total number of devices available for storing protection data for the durability scheme,
  E=20=number of devices needed for durability scheme,
  d=6=number of E-sized sets of devices (vectors),
  e=5=number of E-sized sets of devices in which a device appears.

In this example, a collection of d=6 sets of E=20 devices is called an "optimal map." An E=20 sized set of devices is referred to as a "vector". In this example, there are six sets of twenty devices (e.g., six vectors), and any one device appears in five of the six sets. The vectors are:
  Vector0, d1-d20
  Vector1, d21-d24, d1-d16
  Vector2, d17-d24, d1-d12
  Vector3, d13-d24, d1-d8
  Vector4, d9-d24, d1-d4
  Vector5, d5-d24

Disk 1 appears in vectors 0, 1, 2, 3, 4. Thus, if disk 1 fails, vectors 0, 1, 2, 3, and 4 are affected, while vector 5 is unaffected. Disk 2 also appears in vectors 0, 1, 2, 3, 4 and thus the same vectors would be affected. Disk 5 appears in vectors 0, 1, 2, 3, 5. Thus, if disk 5 fails, vectors 0, 1, 2, 3, and 5 are affected while vector 4 is unaffected. Disk 6 also appears in vectors 0, 1, 2, 3, 5 and thus the same vectors would be affected. As identified below, disks appear in five vectors, and thus if a disk fails, five vectors are affected and one vector is unaffected.
  Disk 9 appears in vectors 0, 1, 2, 4, 5
  Disk 10 appears in vectors 0, 1, 2, 4, 5
  Disk 13 appears in vectors 0, 1, 3, 4, 5
  Disk 14 appears in vectors 0, 1, 3, 4, 5
  Disk 21 appears in vectors 1, 2, 3, 4, 5
  Disk 24 appears in vectors 1, 2, 3, 4, 5

While the vectors are illustrated having collections of neighboring devices, other allocation schemes may be employed. For example, alternating devices may be allocated to vectors, alternating pairs may be allocated to vectors, or other patterns may be employed. While D is shown as D=24 and E=20, in practice, D will likely be much larger than E (e.g., D=1024, E=6).

Given the set of vectors illustrated in FIG. 1, where the set of vectors partition and organize the collection of D available devices, how is a vector selected when an item is presented to the data storage system for storage? In one embodiment, a hash function having a uniform distribution over a hash number space is employed. The item is presented to the system, it is hashed using the hash function, and the vector is selected using the hash number as the key and the item or the protection data for the item as the value. For example, the vector may be selected using the value produced by hash value mod d. When the hash function has a uniform distribution, then the d vectors will be used substantially uniformly, which in turn will lead to the D devices being used substantially uniformly. Using the devices substantially uniformly facilitates both wear levelling and maximizing performance because a greater number of devices are used in parallel. In one embodiment, being used "substantially uniformly" means that the utilization of all devices is within 10% of an average utilization for the set of devices.

FIG. 2 illustrates a D=48, E=20 example. In the example:
  D=48=total number of devices available for durability scheme,
  E=20=number of devices needed for durability scheme,
  d=12=number of E-sized sets of devices,
  e=5=number of E-sized sets of devices in which a device appears.

In this example, there are twelve sets of twenty devices, and any one device appears in five of the six sets. The vectors are:
  Vector0, d1-d20
  Vector1, d21-d40
  Vector2, d41-d48, d1-d12
  Vector3, d13-d32
  Vector4, d33-d48, d1-d4
  Vector5, d5-d24
  Vector6, d25-d44
  Vector7, d44-d48, d1-16
  Vector 8, d17-d36
  Vector9, d37-d48, d1-d8
  Vector10, d9-d28
  Vector11, d29-d48

Disk 1 appears in vectors 0, 2, 4, 7, and 9. Thus, if disk 1 fails, vectors 0, 2, 4, 7, and 9 are affected, while the other 7 vectors are not affected. FIG. 3 illustrates the same D=48, E=20 example, with the same allocations of devices, but with a failure in disk 9. The failure in disk 9 affects vectors 0, 2, 5, 7, and 10. Vectors 0, 2, 5, 7, and 10 may therefore need to be rebuilt or it may simply be desired to rebuild these vectors. Since vectors 1, 3-4, 6, 8-9, and 11 are available and unaffected, rebuilding vectors 0, 2, 5, 7, and 10 may be undertaken using the available and unaffected vectors. In one embodiment, the rebuild may begin automatically, without human interaction, because example apparatus and methods are associated with automated computer processes. Multiple damaged vectors may be rebuilt in parallel.

FIG. 4 illustrates the same D=48, E=20 example, with the same allocations of devices, but with a failure in disk 9 and a failure in disk 17. When disk 9 fails it affects five of the twelve vectors. When disk 17 fails, it also affects five of the twelve vectors, but not necessarily the same five vectors. The failure in disk 9 affects vectors 0, 2, 5, 7, and 10. The failure in disk 17 affects vectors 0, 3, 5, 8, and 10. Vectors 0, 2, 3, 5, 7, 8, and 10 may therefore need to be rebuilt or it may simply be desired to rebuild these vectors. Note that vectors 0, 5, and 10 have two affected disks, and vectors 2, 3, 7, and 8 have one affected disk. Since vectors 1, 4, 6, 9, and 11 are available and unaffected, rebuilding the affected vectors may be undertaken using the available and unaffected vectors. Since vectors 0, 5, and 10 have two affected disks, they may be rebuilt first. Vectors 2, 3, 7, and 8 may then be rebuilt. The rebuild of vectors 0, 5, and 10 may begin automatically, without human interaction, because the example apparatus and methods are automated, computerized processes. Since 5 vectors are unaffected and available, the rebuild of vectors 0, 5, and 10 may proceed in parallel.

The data for the rebuilt vectors will not be stored back on the damaged vectors and thus information to redirect a request for information from a damaged vector to a vector used for the rebuild may need to be stored. At some point, disks 9 and 17 may be replaced, repaired, or otherwise made available. At this time, rebuilt information that was stored elsewhere may be copied back to the previously affected vector, and redirection information may be dismissed, deleted, or otherwise manipulated to no longer redirect requests. Once again, the information for redirecting a request for data directed at a damaged vector to a replacement vector will be stored automatically under computer control. Similarly, copying back the rebuilt information occurs automatically under apparatus or process control.

Figure 5:
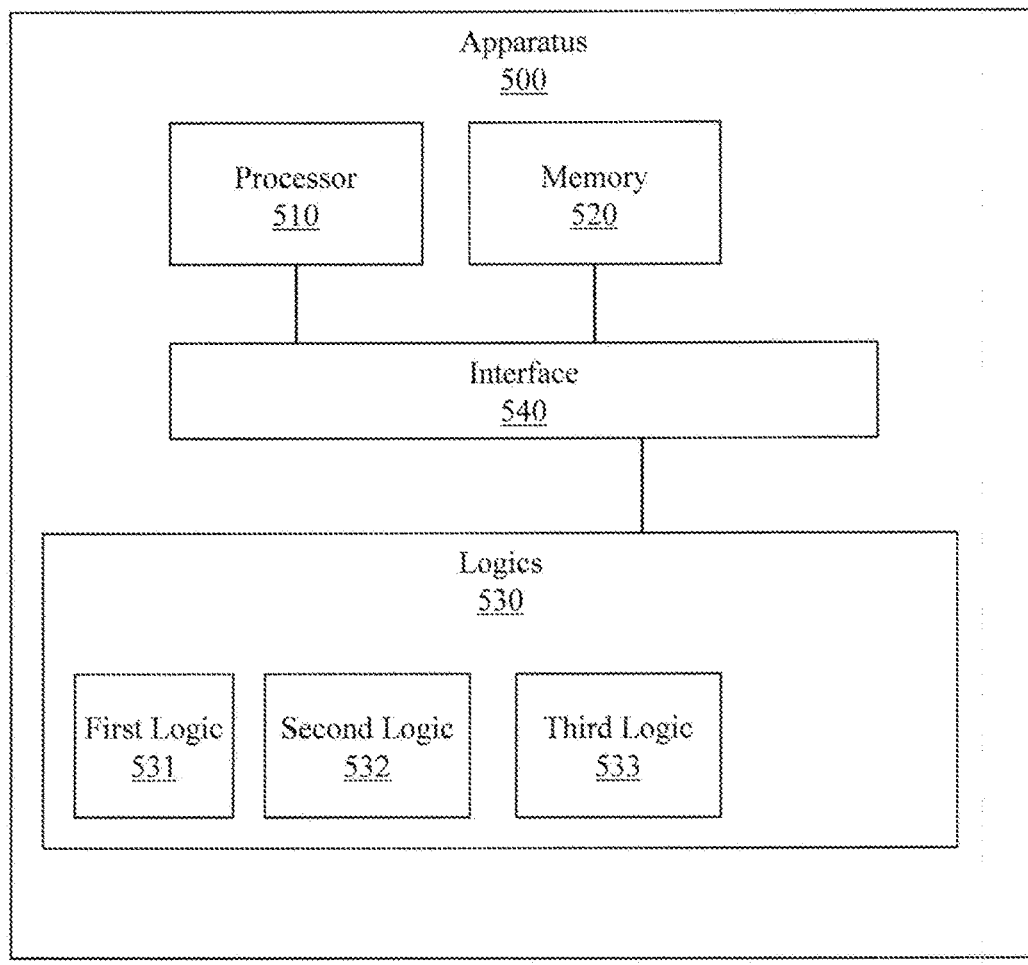
FIG. 5 illustrates an example apparatus associated with improved storage conditioning with intelligent rebuild.

FIG. 5 illustrates an apparatus 500 that provides improved storage conditioning with an intelligent rebuild capacity for a collection of storage devices (e.g., disks). Apparatus 500 includes a processor 510, a memory 520, and a set 530 of logics that is connected to the processor 510 and memory 520 by a computer hardware interface 540. In one embodiment, processor 510 and the set of logics 530 provide storage conditioning with intelligent rebuild for a set of data storage devices.

In one embodiment, the functionality associated with the set of logics 530 may be performed, at least in part, by hardware logic components (e.g., integrated circuits) including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 530 are implemented as ASICs or SOCs. In one embodiment, the first logic 531, the second logic 532, or the third logic 533 may be ASICs, FPGA, or other integrated circuits.

The set 530 of logics includes a first logic 531 that produces and stores, in a data storage system having D DSDs, E erasure codes (ECs) for an object. D and E are integers. The first logic 531 produces and stores the ECs when D is greater than E. The apparatus 500 also includes a second logic 532 that produces a map of vectors of the D DSDs. A vector is a collection of E of the D DSDs. The map includes d vectors, d being an integer. A DSD in the D DSDs appears in e vectors in the map of vectors, e being an integer, d/e is the reduced form of D/E. Examples of d/e as a reduced form of D/E are provided in connection with FIGS. 1-4.

The apparatus 500 also includes a third logic 533 that produces a hash value for the object. The third logic 533 also selects a destination vector to store the E ECs. The destination vector is selected from the map of vectors based, at least in part, on the hash value. For example, a hash number space associated with the hash function may be partitioned into d equal ranges and the ranges may be associated with the different available vectors. In one embodiment, the third logic 533 produces the hash value using a hash function that selects vectors in the map of vectors according to a pre-determined distribution. In one embodiment, the pre-determined distribution is a distribution where members of the d vectors are selected within 10% of an average selection rate for all members of the d vectors. In another embodiment, the pre-determined distribution is a distribution where members of the d vectors are selected within 1% of an average selection rate for all members of the d vectors. This means that all the d vectors are used substantially the same amount. Since all the d vectors are used substantially the same amount, then all members of the D DSDs are used substantially the same amount. Using all the devices substantially the same amount facilitates improving performance by allowing more operations to proceed in parallel. When vectors and thus devices are used unequally, then it may be difficult, if even possible at all, to perform parallel operations. Instead, a single vector or single device may become a bottleneck. Thus, example apparatus and methods solve the concrete, tangible, real-world problem of unequal device utilization in a data storage system producing a single (or multi) device bottleneck.

Figure 6:
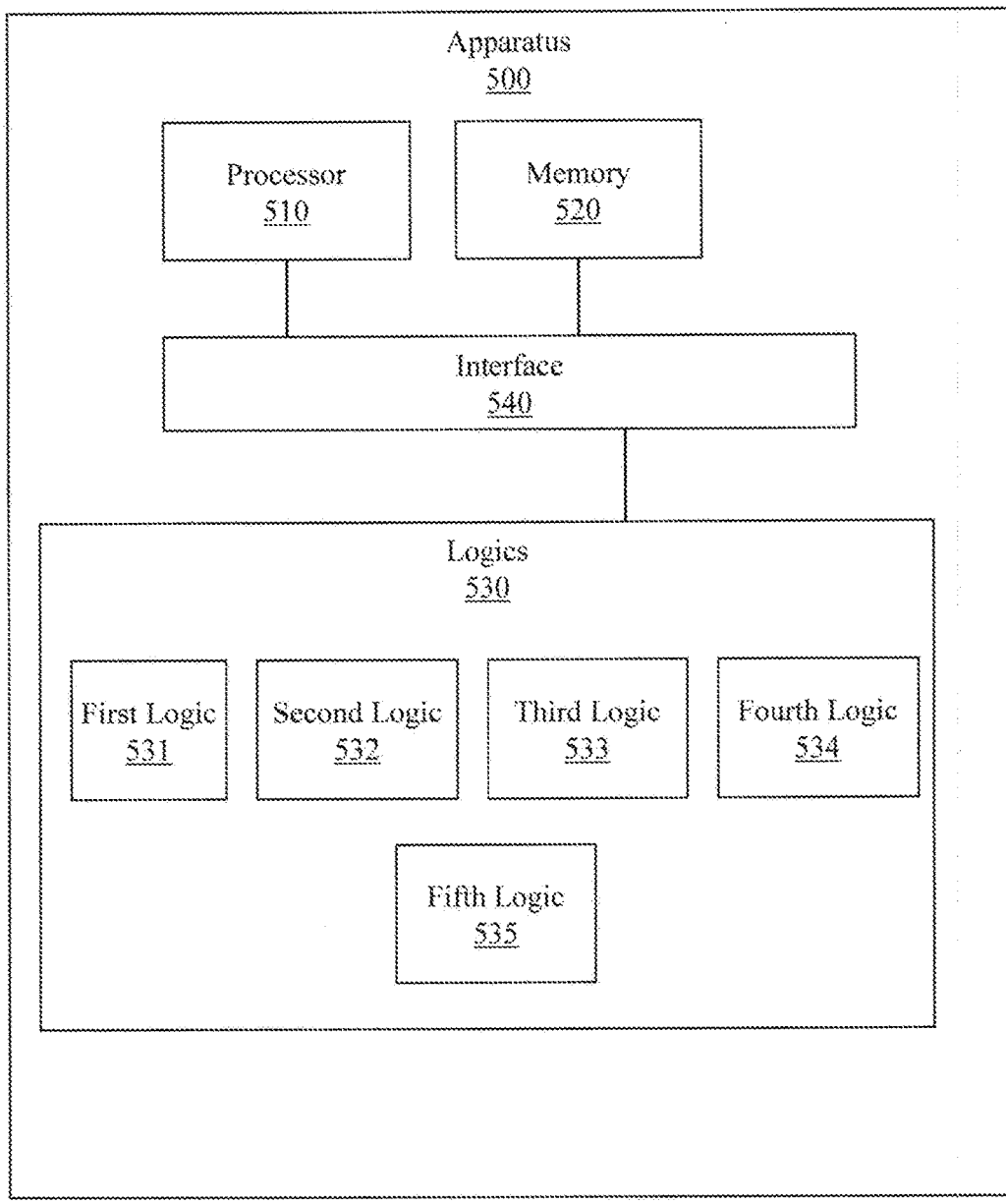
FIG. 6 illustrates an example apparatus associated with improved storage conditioning with intelligent rebuild.

FIG. 6 illustrates another embodiment of apparatus 500. This embodiment also includes a fourth logic 534 that identifies a compromised vector in the map of vectors that is affected by a first DSD in the D DSDs becoming unable to store ECs produced by the first logic. The first DSD may be unable to store ECs because it has reached a capacity, is broken, is offline, is unreachable through a network or other data communication scheme, or for some other reason.

Having identified a compromised vector, the fourth logic 534 also identifies an intact vector in the map of vectors that is not affected by the first DSD becoming unable to store ECs produced by the first logic. FIGS. 3 and 4 illustrate the impact of a device becoming unavailable. Apparatus 500 provides an intelligent rebuild capability, and thus fourth logic 534 produces a complete set of ECs from an incomplete set of ECs in the compromised vector. Once the complete set of ECs is available, fourth logic 534 distributes the complete set of ECs to the intact vector and controls the data storage system to satisfy requests to the compromised vector from the intact vector.

This embodiment also includes a fifth logic 535 that identifies that the first DSD has once again become able to store ECs produced by the first logic 531. For example, the first DSD may once again be reachable by a data communication network, may have been replaced with a functional device, or otherwise made available. Thus the fifth logic 535 restores the compromised vector by copying the complete set of ECs from the intact vector to the compromised vector. Once the transfer back to the compromised vector has been made, the fifth logic 535 may control the data storage system to satisfy requests to the compromised vector from the compromised vector.

In one embodiment, the fifth logic 535 deletes the complete set of ECs from the intact vector. In another embodiment, the fifth logic 535 may leave all or a portion of the complete set of ECs on the intact vector as, for example, a replica. In one embodiment, the complete set of ECs on the intact vector may be left in place for a pre-determined period of time to handle the situation where the first DSD may be having intermittent or repetitive issues. In this case, the apparatus 500 would already know that a complete set of ECs is available in the intact vector location and would not need to recreate the incomplete set of ECs.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 7:
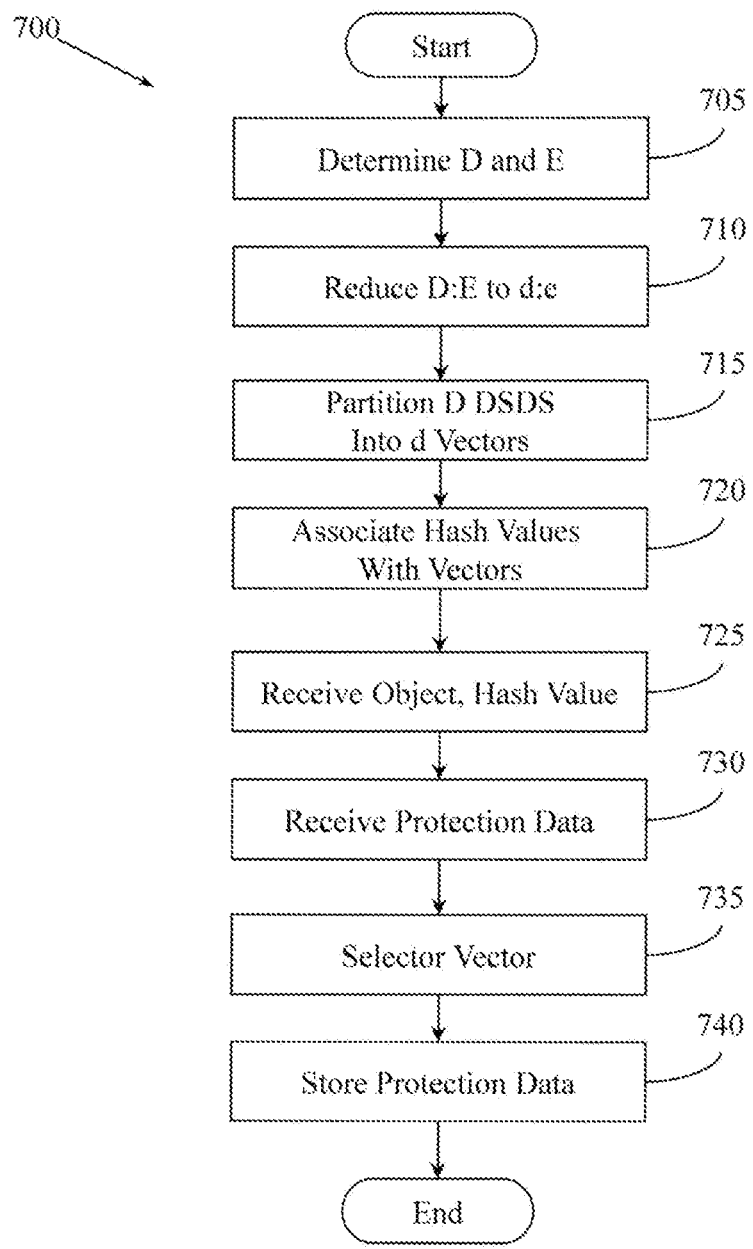
FIG. 7 illustrates an example method associated with improved storage conditioning with intelligent rebuild.

FIG. 7 illustrates an example computerized method 700 associated with improved storage conditioning with intelligent rebuild. Method 700 can only be performed in a computer because electronic voltages or other computer signals need to be generated to control electronic data storage devices. These electronic voltages or other computer signals cannot be generated by pen and paper or in the human mind.

Method 700 includes, at 705, determining a number D of DSDs in the computer storage system that are available to store protection data items produced by an automated durability process. Method 700 also includes, at 705, determining a number E of DSDs used by the automated durability process to protect data stored by the computer storage system.

The automated durability process may be associated with, for example, an erasure code (EC) process or apparatus, a redundant array of independent disks (RAID) process or apparatus, a replication process or apparatus, or other protection scheme. Thus, the protection data may include erasure codes, copies of an item, or portions of an item to be distributed. In different embodiments, the computer storage system may be a single apparatus, or two or more apparatus. In one embodiment, the computer storage system includes at least one storage device located in the cloud. In different embodiments, the automated durability process runs in the computer storage system or runs at least partially in the cloud. In one embodiment, the automated durability process operates independent of the value for D. For example, the automated durability process may decide to use an A/B erasure code scheme regardless of the number D.

Upon determining that D is greater than E, method 700 proceeds, at 710, to produce a reduced form d:e of a ratio D:E, where d and e are numbers. Reduced forms for different examples of D and E are provided in connection with FIGS. 1-4. Other example reduced forms include: (D:E 10:5, d:e 2:1), (D:E 40:2, d:e 20:1).

Method 700 also includes, at 715, producing a partitioning of the D DSDs. The partitioning organizes the D DSDs into d sets of devices. A member of the D DSDs appears in e of the d sets of devices. Example partitions are illustrated in FIGS. 1-4.

Method 700 also includes, at 720, associating a range of hash values with a member of the d sets of DSDs. The range of hash values are associated with a hash function used to hash an item presented to a key/value store for storage. In one embodiment, the hash function runs in the computer storage system. In another embodiment, the hash function runs at least partially in the cloud. In one embodiment, the hash function and the partitioning are configured to cause DSDs in the D DSDs to operate within 10% of an average utilization of the D DSDs. For example, if there are four DSDs, and their average utilization is 80%, then all four DSDs would have between 70% and 90% utilization.

Method 700 also includes, at 725, receiving an object to be stored in the key/value store and receiving a hash value for the object from the hash function. The hash value is established as the key value for the key/value store. The object may be, for example, a file, a record, an object, or other collection of data to be stored using a key:value pair interface. When certain protection schemes are used, the actual object may never get stored. For example, in an erasure code scheme, erasure codes may be generated and stored rather than an instance of the object. Thus, the erasure codes may be the values for the key:value interface.

Method 700 also includes, at 730, receiving an E-sized set of protection data items for the object from the automated durability process. The E-sized set of protection data may include, for example, E erasure codes. The erasure codes may include systematic or non-systematic erasure codes. For example, the E erasure codes may include E-x systematic erasure codes and x non-systematic erasure codes.

Method 700 also includes, at 735, selecting a first member of the d sets of DSDs to store the E-sized set of protection data items. The selection is based, at least in part, on the hash value. For example, a vector may be selected using vector=hash value mod d.

Method 700 also includes, at 740, storing the E-sized sets of protection data items on DSDs in the selected first member of the d sets of DSDs. Storing the E-sized set of protection data items includes storing one member of the E-sized set of protection data items per DSD in the first member of the d sets of DSDs.

Figure 8:
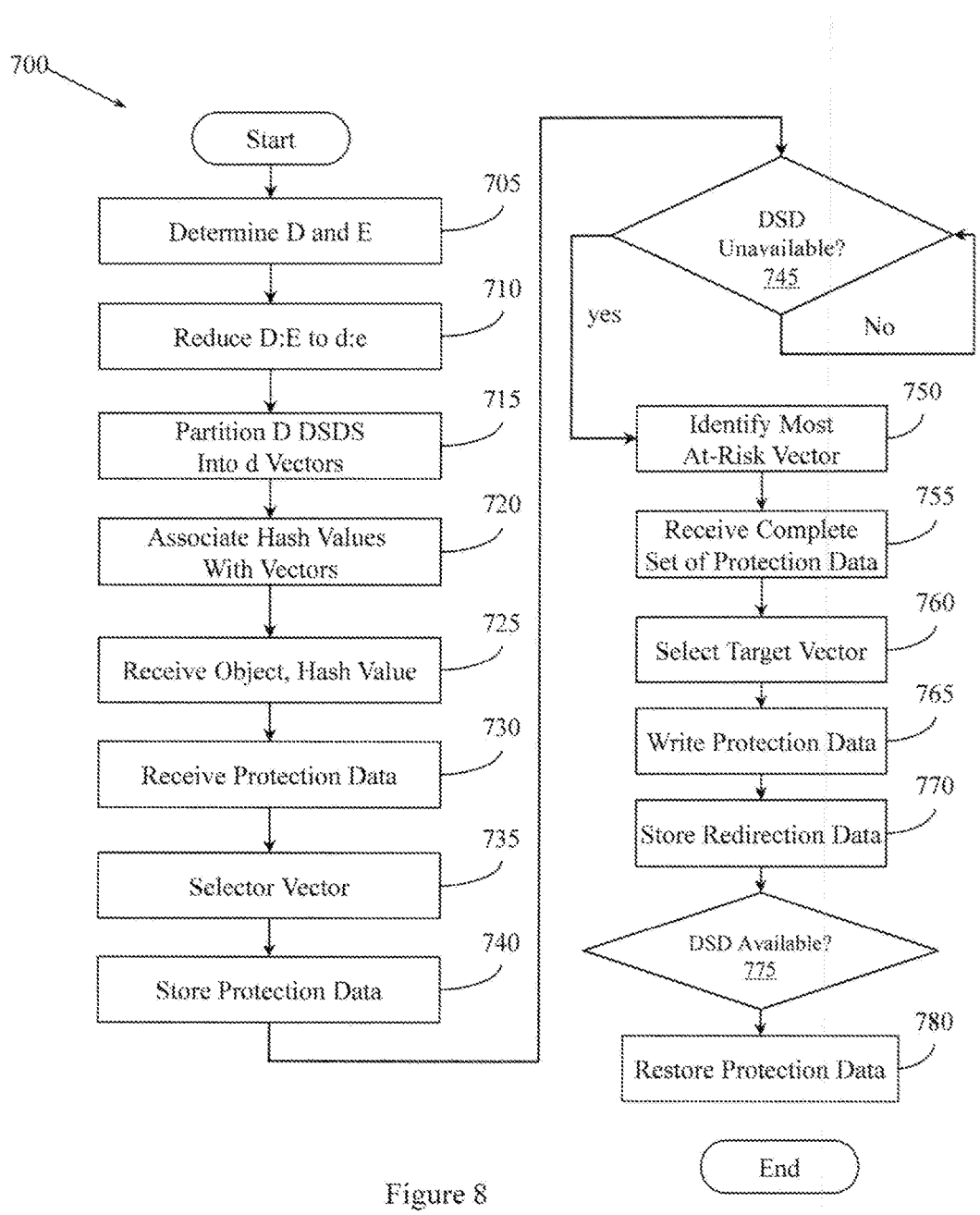
FIG. 8 illustrates an example method associated with improved storage conditioning with intelligent rebuild.

FIG. 8 illustrates another embodiment of method 700. This embodiment also includes, at 745, detecting that a threshold number of DSDs in the D DSDs have become unavailable to store protection data items produced by the automated durability process. The DSDs may be unavailable because they are broken, because a network connection to the devices is down, because the devices are being replaced, or for other reasons. Upon detecting that a threshold number is unavailable, method 700 continues, at 750, by identifying a source member of the d sets of DSDs having a greatest number of DSDs that are unavailable to store protection data items produced by the automated durability process. Identifying the source member having the greatest number of DSDs unavailable identifies the most at-risk data. As illustrated in FIG. 4, two or more vectors may share a greatest number of unavailable DSDs. In this case, if there are sufficient unaffected vectors, then in one embodiment, the two or more most affected vectors may be handled in parallel. In another embodiment, members of the two or more most affected vectors may be handled serially.

Method 700 then proceeds, at 755, by receiving a complete reconstructed set of protection data items from the automated durability process. The complete reconstructed set of protection data items is produced from an incomplete set of protection data items stored on DSDs that are available in the source member. For example, the incomplete set may be read and then the missing pieces of protection data can be built using the available pieces.

Method 700 then proceeds, at 760, by identifying a target member of the d sets of DSDs having a complete set of DSDs that are available to store protection data items produced by the automated durability process. The target member will be used to store the reconstructed set of protection data items. If a target vector with a complete set of DSDs is unavailable, then a target vector having a most complete set of DSDs may be selected.

Thus, method 700 proceeds, at 765, by storing the complete reconstructed set of protection data items on DSDs in the target member. Since the protection data from the damaged source vector is no longer where the hash function will direct requests to find the data, method 700 then proceeds, at 770, by creating or storing redirection data that controls a request for data from the source member to be redirected to the target member.

At some point in time, the identified member of the D DSDs may once again become available to store protection data. Thus, at 775, upon detecting that the identified member of the D storage devices has become available to store protection data items produced by the automated durability process, method 700 proceeds, at 780, by restoring the protection data to its original location. Restoring the protection data may include reading the complete reconstructed set of protection data items from the target member, writing the complete reconstructed set of protection data items read from the target member to the source member, and deactivating the redirection data. In one embodiment, the complete reconstructed set of protection data items may be deleted from the target member. In another embodiment, the copy of the complete reconstructed set of protection data items may be left in place on the target member as a replica.

In one example, a method may be implemented as computer executable instructions. Thus, in one example, a computer-readable medium may store computer executable instructions that if executed by a machine (e.g., processor) cause the machine to perform method 700. While executable instructions associated with method 700 are described as being stored on a computer-readable medium, it is to be appreciated that executable instructions associated with other example methods described herein may also be stored on a computer-readable medium.

Figure 9:
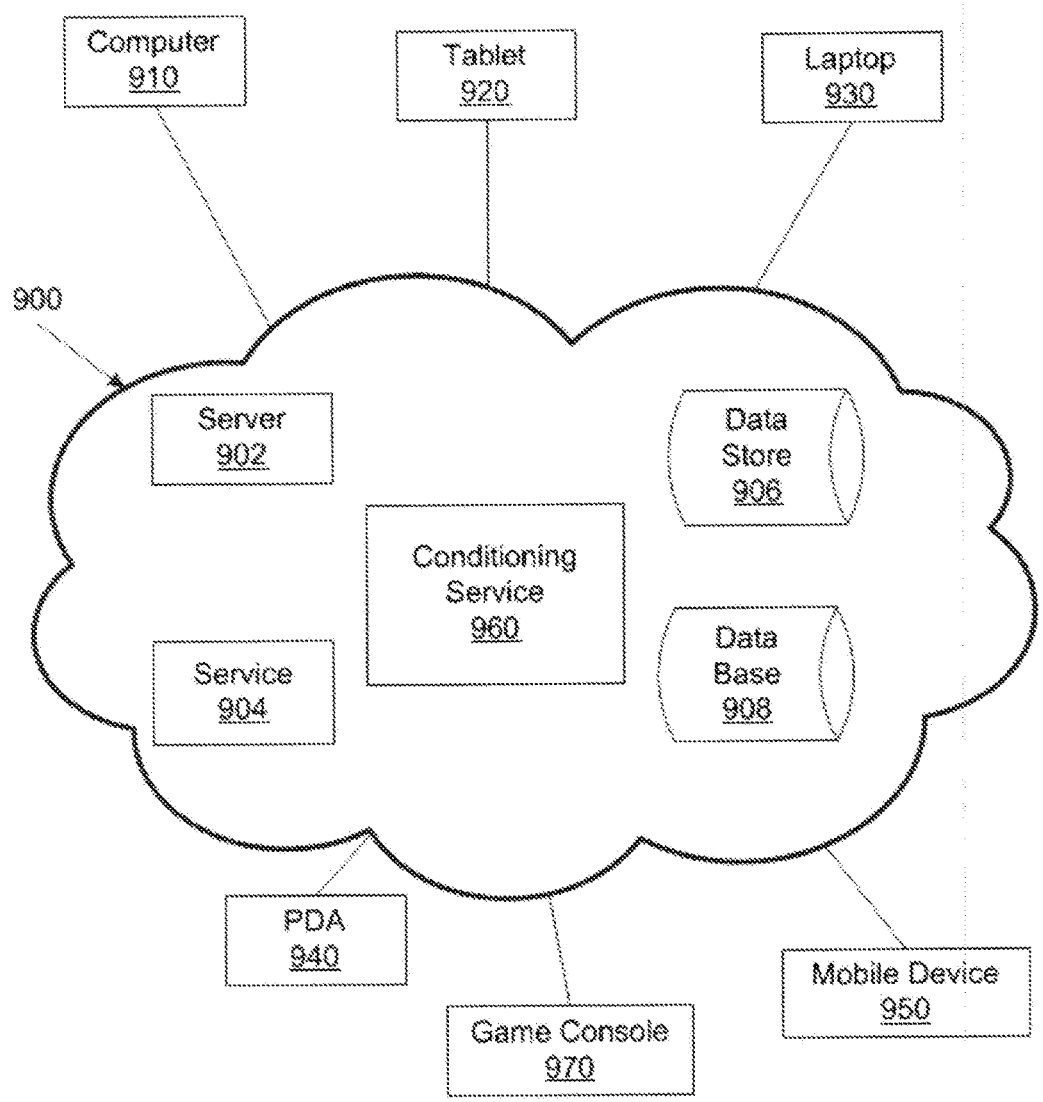
FIG. 9 illustrates an example cloud-based service associated with improved conditioning with intelligent rebuild.

FIG. 9 illustrates an example cloud operating environment 900. A cloud operating environment 900 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 9 illustrates an example conditioning service 960 residing in the cloud. The conditioning service 960 may rely on a server 902 or service 904 to perform processing and may rely on a data store 906 or database 908 to store data. While a single server 902, a single service 904, a single data store 906, and a single database 908 are illustrated, multiple instances of servers, services, data stores, and databases may reside in the cloud and may, therefore, be used by the conditioning service 960.

FIG. 9 illustrates various devices accessing the conditioning service 960 in the cloud. The devices include a computer 910, a tablet 920, a laptop computer 930, a personal digital assistant 940, a mobile device (e.g., cellular phone, satellite phone, wearable computing device) 950, and a game console 970. The service 960 may control a computer to partition available DSDs into vectors, to distribute erasure codes or other protection data between the vectors, and to intelligently and automatically rebuild a vector when it becomes compromised or at risk.

It is possible that different users at different locations using different devices may access the conditioning service 960 through different networks or interfaces. In one example, the service 960 may be accessed by a mobile device 950. In another example, portions of service 960 may reside on a mobile device 950.

Figure 10:
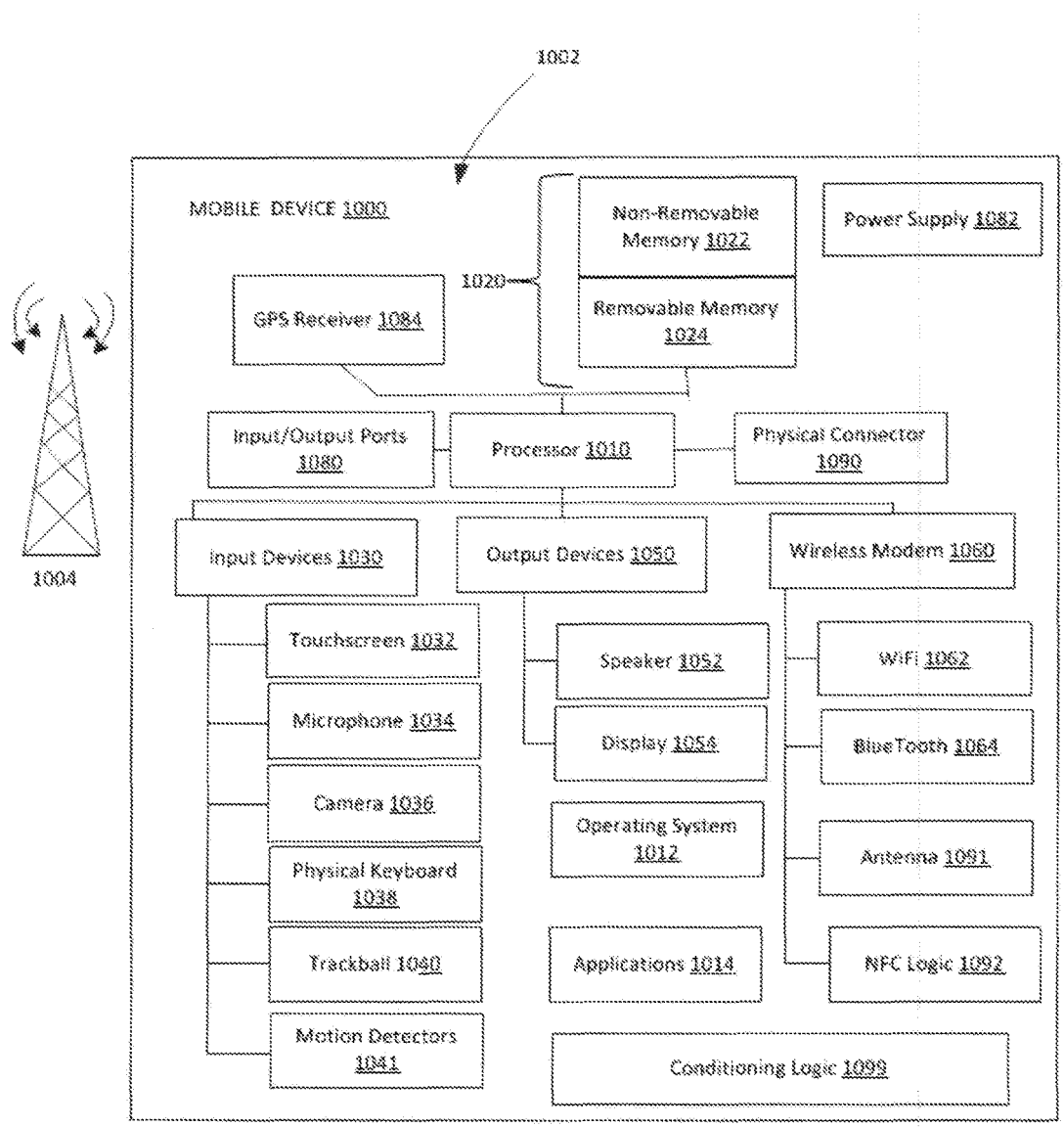
FIG. 10 illustrates an example mobile device associated with improved conditioning with intelligent rebuild.

FIG. 10 is a system diagram depicting an exemplary mobile device 1000 that includes a variety of optional hardware and software components, shown generally at 1002. Components 1002 in the mobile device 1000 can communicate with other components, although not all connections are shown for ease of illustration. The mobile device 1000 may be a variety of computing devices (e.g., cell phone, smartphone, handheld computer, Personal Digital Assistant (PDA), wearable computing device, game console) and may allow wireless two-way communications with mobile communications networks 1004 (e.g., cellular network, satellite network).

Mobile device 1000 may include a controller or processor 1010 (e.g., signal processor, microprocessor, ASIC, or other control and processing logic circuitry) for performing tasks including signal coding, data processing, input/output processing, power control, or other functions. An operating system 1012 can control the allocation and usage of the components 1002 and support application programs 1014.

Mobile device 1000 can include memory 1020. Memory 1020 can include non-removable memory 1022 or removable memory 1024. The non-removable memory 1022 can include random access memory (RAM), read only memory (ROM), flash memory, a hard disk, or other memory storage technologies. The removable memory 1024 can include flash memory or a Subscriber Identity Module (SIM) card, which is well known in GSM communication systems, or other memory storage technologies, such as "smart cards." The memory 1020 can be used for storing data or code for running the operating system 1012 and the applications 1014. Example data can include an optimal map of vectors, DSD identifiers, vector identifiers, hash function data, or other data. The memory 1020 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 1000 can support input devices 1030 including, but not limited to, a touchscreen 1032, a microphone 1034, a camera 1036, a physical keyboard 1038, or trackball 1040. The mobile device 1000 may also support output devices 1050 including, but not limited to, a speaker 1052 and a display 1054. Other possible output devices (not shown) can include piezoelectric or other haptic output devices. Some devices can serve more than one input/output function. For example, touchscreen 1032 and display 1054 can be combined in a single input/output device. The input devices 1030 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can include speech-recognition software as part of a voice user interface that allows a user to operate the device 1000 via voice commands. Further, the device 1000 can include input devices and software that allow for user interaction via a user's spatial gestures, such as detecting and interpreting gestures to provide input to a storage conditioning apparatus or method. The input devices 1030 may also include motion sensing input devices (e.g., motion detectors 1041).

A wireless modem 1060 can be coupled to an antenna 1091. In some examples, radio frequency (RF) filters are used and the processor 1010 need not select an antenna configuration for a selected frequency band. The wireless modem 1060 can support two-way communications between the processor 1010 and external devices. The modem 1060 is shown generically and can include a cellular modem for communicating with the mobile communication network 1004 and/or other radio-based modems (e.g., Bluetooth 1064 or Wi-Fi 1062). The wireless modem 1060 may be configured for communication with one or more cellular networks, such as a Global system for mobile communications (GSM) network for data and voice communications within a single cellular network, between cellular networks, or between the mobile device and a public switched telephone network (PSTN). NFC logic 1092 facilitates having near field communications (NFC).

The mobile device 1000 may include at least one input/output port 1080, a power supply 1082, a satellite navigation system receiver 1084, such as a Global Positioning System (GPS) receiver, or a physical connector 1090, which can be a Universal Serial Bus (USB) port, IEEE 1394 (FireWire) port, RS-232 port, or other port. The illustrated components 1002 are not required or all-inclusive, as other components can be deleted or added.

Mobile device 1000 may include a conditioning logic 1099 that is configured to provide a functionality for the mobile device 1000. For example, logic 1099 may provide a client for interacting with a service (e.g., service 960, FIG. 9). Portions of the example methods described herein may be performed by logic 1099. Similarly, logic 1099 may implement portions of apparatus described herein. In one embodiment, logic 1099 may be an integrated circuit. The integrated circuit may include circuits that automatically maintain a desired level of protection for data in a conditioned pool of storage having D DSDs arranged in d vectors of E DSDs. The circuits may automatically move at-risk data from a most-compromised home vector in the d vectors to a temporary vector in the d vectors, where D is greater than E, d/e is a reduced form of D/E, and d, D and E are numbers. Mobile device 1000, and logic 1099 may be part of a scale out object store system that includes two or more conditioned storage pools that provide a key:value pair interface, where different members of the two or more storage pools are supported by different instances of improved storage conditioning with intelligent rebuild processes.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. "Computer-readable storage device" does not refer to propagated signals. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, refers to computer hardware or firmware, and/or combinations of each to perform a function (s) or an action(s), and/or to cause a function or action from another logic, method, and/or system. Logic may include, for example, an instruction controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"User", as used herein, includes but is not limited to one or more persons, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A computerized method performed in a computer storage system, comprising:
    determining a number D of data storage devices (DSDs) in the computer storage system that are available to store protection data items produced by an automated durability process;
    determining a number E of DSDs used by the automated durability process to protect data stored by the computer storage system;
    upon determining that D is greater than E:
        producing a reduced form d:e of a ratio D:E, where d and e are numbers;
        producing a partitioning of the D DSDs, where the partitioning organizes the D DSDs into d sets of devices, where a member of the D DSDs appears in e of the d sets of devices;
        associating a range of hash values with a member of the d sets of DSDs, where the range of hash values are associated with a hash function used to hash an item presented to a key/value store for storage;
        receiving an object to be stored in the key/value store;
        receiving a hash value for the object from the hash function and establishing the hash value as the key value for the key/value store;
        receiving an E-sized set of protection data items for the object from the automated durability process;
        selecting a first member of the d sets of DSDs to store the E-sized set of protection data items based, at least in part, on the hash value; and
        storing the E-sized sets of protection data items on DSDs in the first member of the d sets of DSDs.

2. The computerized method of claim 1, where the computer storage system is a single apparatus.

3. The computerized method of claim 1, where the computer storage system is two or more apparatus.

4. The computerized method of claim 1, where the computer storage system includes at least one storage device located in the cloud.

5. The computerized method of claim 1, where the automated durability process runs in the computer storage system.

6. The computerized method of claim 1, where the automated durability process runs at least partially in the cloud.

7. The computerized method of claim 1, where the hash function runs in the computer storage system.

8. The computerized method of claim 1, where the hash function runs at least partially in the cloud.

9. The computerized method of claim 1, where the automated durability process is an erasure code (EC) process.

10. The computerized method of claim 1, where the automated durability process is a redundant array of independent disks (RAID) process.

11. The computerized method of claim 1, where the automated durability process is a replication process.

12. The computerized method of claim 1, where storing the E-sized set of protection data items includes storing one member of the E-sized set of protection data items per DSD in the first member of the d sets of DSDs.

13. The computerized method of claim 1, comprising:
    upon detecting that a threshold number of DSDs in the D DSDs have become unavailable to store protection data items produced by the automated durability process:
        identifying a source member of the d sets of DSDs having a greatest number of DSDs that are unavailable to store protection data items produced by the automated durability process;
        receiving a complete reconstructed set of protection data items from the automated durability process, where the complete reconstructed set of protection data items is produced from an incomplete set of protection data items stored on DSDs that are available in the source member;
        identifying a target member of the d sets of DSDs having a complete set of DSDs that are available to store protection data items produced by the automated durability process;
        storing the complete reconstructed set of protection data items on DSDs in the target member; and
        storing redirection data that controls a request for data from the source member to be redirected to the target member.

14. The computerized method of claim 13, comprising:
    upon detecting that the identified member of the D DSDs has become available to store protection data items produced by the automated durability process:
        reading the complete reconstructed set of protection data items from the target member;
        writing the complete reconstructed set of protection data items read from the target member to the source member; and
        deactivating the redirection data.

15. The computerized method of claim 14, comprising:
    deleting the complete reconstructed set of protection data items from the target member.

16. The computerized method of claim 1, where the hash function and the partitioning are configured to cause DSDs in the D DSDs to operate within 10% of an average utilization of the D DSDs.

17. The computerized method of claim 1, where the automated durability process operates independent of the value for D.

\* \* \* \* \*